Nov. 23, 1954  M. SABINE  2,695,329
ELECTRICAL CONDUCTOR
Filed April 9, 1951  5 Sheets-Sheet 1

INVENTOR
MAURICE SABINE
By:
Valentine, Lake & Co.
AGENTS

Nov. 23, 1954  M. SABINE  2,695,329
ELECTRICAL CONDUCTOR
Filed April 9, 1951  5 Sheets-Sheet 2

INVENTOR
MAURICE SABINE
By: Haseltine Lake & Co.
AGENTS

Nov. 23, 1954  M. SABINE  2,695,329
ELECTRICAL CONDUCTOR
Filed April 9, 1951 5 Sheets-Sheet 3
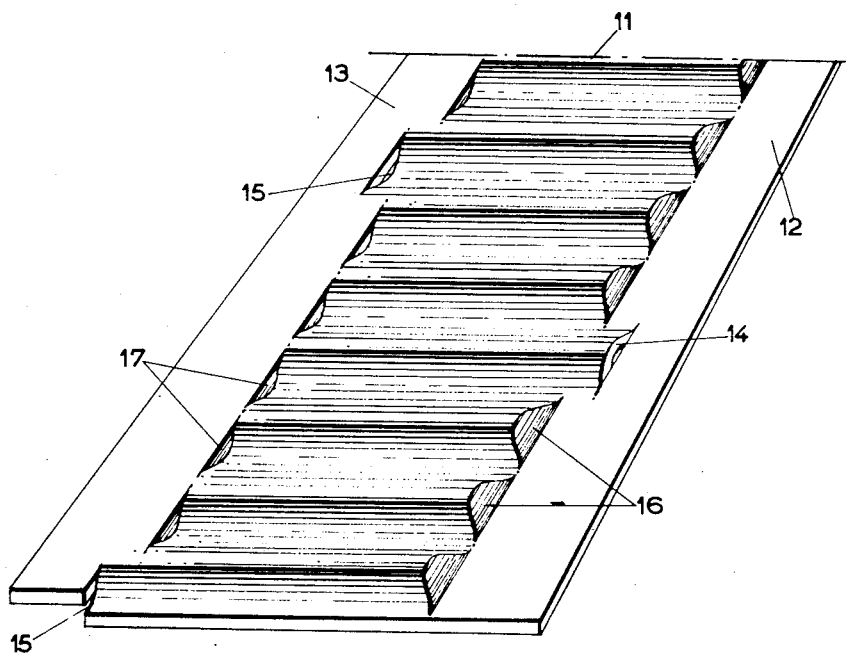
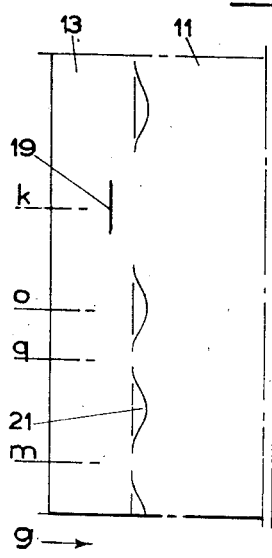
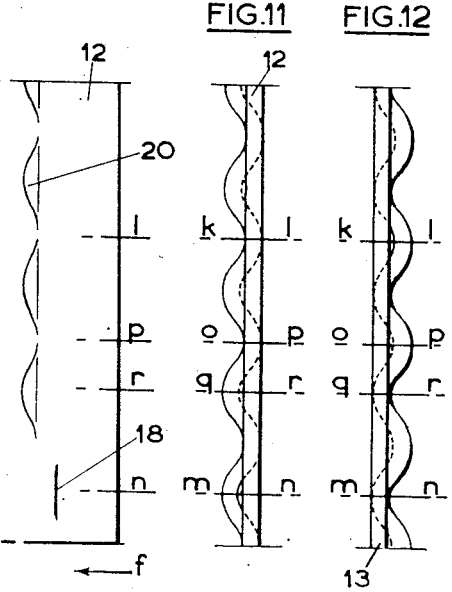
INVENTOR
MAURICE SABINE
By:
Hauntine, Lake & Co.
AGENTS Nov. 23, 1954

M. SABINE 2,695,329

ELECTRICAL CONDUCTOR

Filed April 9, 1951

Inventor
Maurice Sabine
By:
Haseltine, Lake & Co.
Agents

Nov. 23, 1954  M. SABINE  2,695,329
ELECTRICAL CONDUCTOR
Filed April 9, 1951  5 Sheets-Sheet 5

INVENTOR
MAURICE SABINE
By:
Hazeltine, Lake & Co.
AGENTS

United States Patent Office 2,695,329
Patented Nov. 23, 1954

2,695,329

ELECTRICAL CONDUCTOR

Maurice Sabine, Conflans Sainte-Honorine, France, assignor to Societe Lignes Telegraphiques & Telephoniques, Paris, France Application April 9, 1951, Serial No. 220,078

Claims priority, application France July 21, 1950

2 Claims. (Cl. 174—126)

This invention relates to corrugated metal tape for forming a tube, more particularly an electrical conductor.

It is known to manufacture a tube, such, for example, as the outer conductor of a coaxial pair of conductors for an electric telecommunication cable, from a metal tape of small thickness which has corrugations or ridges which are transversal with respect to the longitudinal axis of the tape. The purpose of manufacturing such tubes from corrugated metal tape is to reinforce mechanically the tube against radial stresses and, at the same time, to render the tube more flexible.

The object of the present invention is to provide a method for shaping a thin metal tape in such a manner that it is possible, to manufacture a tube having circular cross sections of accurately uniform diameters, and which has corrugations extending transversely with respect to the axis of the tube. The operation, which is hereinafter described, for manufacturing a tube from a tape will be referred to by the term "cambering."

The thin metal tape embodying the present invention has transverse corrugations which are alternately convex and concave, and is characterized by the following features:

1. The length of the corrugations, in the direction transverse to the axis of the tape, is slightly smaller than the width of the tape, so that there remains on both sides of the tape, a smooth edge portion having a small width as compared to the total width of the tape.

2. All the convex corrugations or part only of such corrugations are terminated adjacent one side of the tape, by a surface or edge perpendicular to the smooth edge portion of the tape, the sharp edge thus obtained acting as a stop.

All the concave corrugations, or part only of said corrugations, are terminated, adjacent the other side of the tape, by a surface or edge perpendicular to the smooth edge portion of the tape so as also to form a stop.

3. The depth of a convex or concave corrugation at the end, where the corrugation is terminated by a surface or edge perpendicular to the adjacent one of the smooth edge portions, is at least equal to the thickness of the metal tape.

4. The planes of the two smooth edge portions of the tape are parallel to each other, and they are offset in the direction normal to said planes by a distance at least equal to the thickness of the metal tape.

In this manner, during the cambering of the tape to form a tube, the two smooth edge portions of the tape overlap in a parallel direction and thus close the tube, without causing any excess thickness at that point. When the tube is formed, each of the side edges of the tape shuts against the stop formed by the ends of the corrugations adjacent the other side edge of the tape so that each of the side edges of the tape thus abuts against a stop, one on the inner side of the tube, the other on the outside of the tube.

The tape is held in the form of a tube, for example by one or more tapes, metallic or not, wound helically around it or by any other known means.

The tube thus obtained cannot be deformed and its diameter is determined in an invariable manner by the abutting of each one of the side edges of the tape against the ends of the corrugations on the opposite side of the tape; also, it cannot exert any radial stresses on elements which may ultimately be placed inside it.

The sharp edge of a corrugation may be obtained, for example, by making a cut between the end of the corrugation and the smooth edge portion; this cut may be effected, for instance, at the same time as the stamping of the corrugations.

According to the present invention there is provided a thin metallic tape for use in manufacturing an electric tubular conductor of circular cross-section for use in telecommunication circuits, provided with corrugations transversal with respect to the direction of its length, the said corrugations having their convexity alternately directed towards one or the other of the two faces of the tape and wherein the transversal length of the corrugations is slightly less than the tape width, so as to leave on either side of the tape a smooth edge portion having a small width compared with the overall tape width. Further, the planes of the two smooth edge portions are parallel and displaced or offset relative to each other in the direction normal to said planes by a distance at least equal to the thickness of the tape, and all or part of the corrugations present, on that side of the tape corresponding to their convex face, an edge or end surface approximately perpendicular to the plane of the adjacent smooth edge portion, thus forming a stop.

The present invention will be more particularly described with reference to the accompanying drawings which illustrate the various types of embodiments of the present invention, which are given by way of example only.

Figure 9 illustrates a perspective view of another tape embodying the present invention;

Figure 10 illustrates a plane view of the tape of Figure 9;

Figures 11 and 12 illustrate profile views of the tape of Figure 9 respectively looking in the directions indicated by the arrows $f$ and $g$ on Fig. 10;

Figure 1:
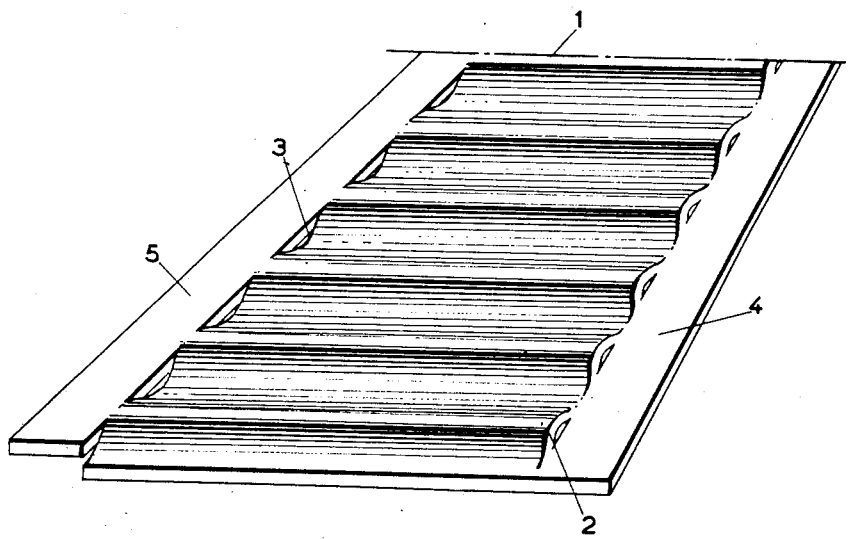
Figure 1 is a perspective view of a length of tape embodying the present invention.

Referring to the drawing and in particular to Figure 1, there is provided a metal tape 1, having a centre portion which consists of convex corrugations 2 and concave corrugations 3, the edge portions 4 and 5 of the said tape remaining smooth. The convex corrugations 2 are terminated at one of their ends, by an end surface or edge which is perpendicular to the smooth edge portion 4. For the sake of example, only the said perpendicular edge is illustrated in Figure 1, by means of a cut. Similarly, all concave corrugations 3 are terminated at one of their ends by an end surface or edge perpendicular to the smooth edge portion 5 and, by way of example only, this perpendicular edge is also illustrated by means of a cut. The figure clearly illustrates that the two smooth edges 4 and 5 do not lie in the same plane.

Figure 2:
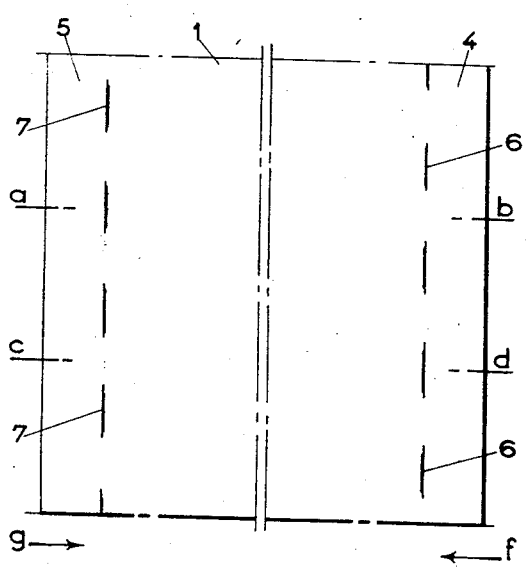
Figure 2 illustrates a plane view of the tape of Figure 1.

Figure 2 illustrates in a plan view, the tape portion of Figure 1; the ends of the convex corrugations perpendicular to the edge 4 are illustrated at 6 and the ends of the concave corrugations perpendicular on the edge 5 are illustrated at 7.

Figures 3, 4:
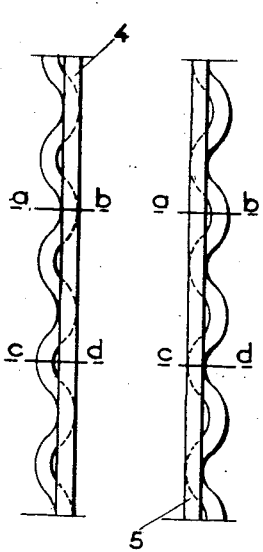
Figures 3 and 4 illustrate profile views of the tape of Figure 1 and viewed in the directions of the arrows $f$ and $g$, respectively, of Fig. 2.

Figure 3 illustrates the profile of the tape 1 of Figure 2 viewed in the direction of the arrow *f*; in Figure 3, the convex corrugations are seen above the smooth edge portion 4.

Figure 4 illustrates the profile of the tape 1 of Figure 2 viewed in the direction of the arrow *g*; in Figure 4, the concave corrugations are seen above the smooth edge portion 5.

Figure 5:
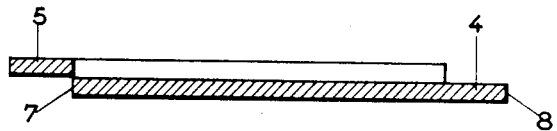
Figures 5 and 6 illustrate cross sections of the tape of Figure 1 respectively taken along the lines $a$—$b$ and $c$—$d$ of Fig. 2.
Figure 6:
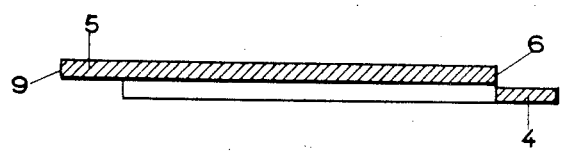

Figure 5 illustrates a section of the tape 1 along *ab* of Figure 2, that is through the lower portion of a concave corrugation and Figure 6 illustrates a section of the tape 1 along *cd* of Figure 2, that is through the top of a convex corrugation; Figures 5 and 6 clearly illustrate that the planes of the two smooth edge portions 4 and 5 are parallel with each other and that they are offset in the direction normal to their planes by a distance at least equal to the thickness of the metal tape.

Figure 7:
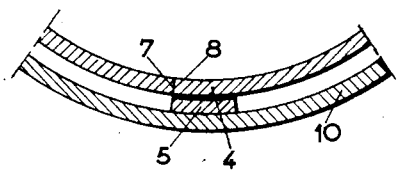
Figures 7 and 8 illustrate, in fragmentary section, a tube formed from the tape of Figure 1, at its point of closure.
Figure 8:
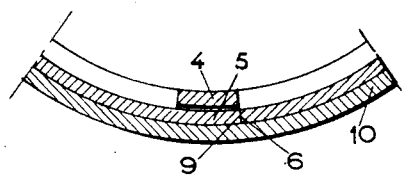

Figures 7 and 8 illustrate in section, a portion of the tube formed by the cambering of the tape 1 at the point of closure of the tube; these figures illustrate the positions taken by the smooth edge portions 4 and 5 which overlap without causing any excess thickness either inside or outside the tube. The section of the tube in Figure 7 corresponds to the section of the tape of Figure 5, and shows how, on the inner side of the tube, the edge 8 of the tape abuts against the ends 7 of the concave corrugations 3 which serve as stops; the section of the tube in Figure 8 corresponds to the section of the tape of Figure 6, and shows how, on the outer side of the tube, the edge 9 of the tape abuts against the ends 6 of the convex corrugations 2 which also form stops so that the extent of overlap is fixed.

Figures 7 and 8 illustrate by way of example, a tape 10 wound helically around the tube formed from the tape 1 and holding the latter in tubular form; the double stops of the edges of the tape against the sharp edges of the corrugations ensures that the diameter of the tube cannot vary.

Figure 15:
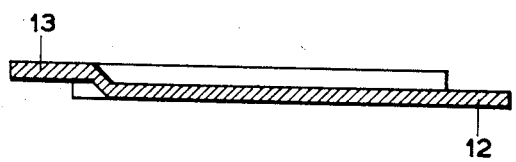
Figure 16:
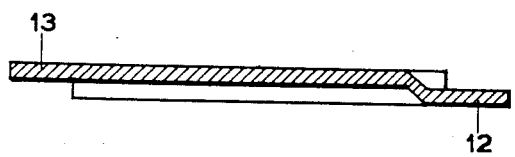

Figure 9 illustrates in perspective, an example of embodiment of a certain length of a metal tape 11 wherein only part of the corrugations have one of their ends forming a sharp edge. Similarly to the tape in Figure 1, the tape 11 shows convex and concave corrugations in its centre portion, the edge portion 12 and 13 remaining smooth; the convex corrugations 14 terminate at one end in an end surface or edge perpendicular to the smooth edge portion 12 and the concave corrugations 15 terminate at one end in an end surface or edge perpendicular to the smooth edge portion 13; the convex corrugations 16 and the concave corrugations 17 which are located between the corrugations 14 and 15 are preferably shorter than the corrugations 14 and 15 so as not to hinder the stopping of the tape edges against the ends of the corrugations 14 and 15 forming perpendicular edges or end surfaces upon the closing of the tube, and the ends of corrugations 16 and 17 may be inclined as shown in Figs. 9, 15 and 16.

Figure 10 illustrates in plane view, a portion of the tape 11; the ends of the convex corrugations 14, perpendicular to the edge portion 12 are illustrated at 18 and the ends of the concave corrugations 15, perpendicular to the edge portion 13 are illustrated at 19; the ends of the corrugations 16 and 17 are illustrated respectively at 20 and 21.

Figure 11 illustrates the profile of the tape 11 in Figure 10 as viewed in the direction of the arrow *f*; the convex corrugations 14 and 16 are seen above the edge portion 12.

Figure 12 illustrates the profile of the tape 11 in Figure 10 as viewed in the direction of the arrow *g*; the concave corrugations 15 and 17 are seen above the edge portion 13.

Figure 13:
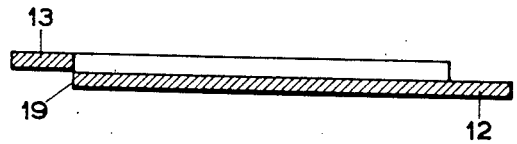
Figures 13, 14, 15 and 16 illustrate cross sections of the tape of Figure 9 respectively taken along the lines $k$—$l$, $m$—$n$, $o$—$p$ and $q$—$r$.
Figure 14:
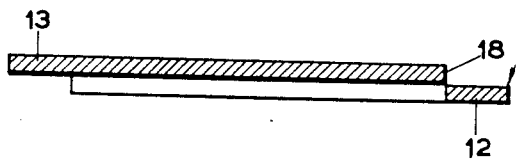

Figures 13 and 14 illustrate sections of the tape 11 facing a corrugation the end of which forms a sharp edge, Figure 13 being a section made at *kl* and going through the lower portion of a concave corrugation 15 and Figure 14 being a section made at *mn* and going through the upper portion of a convex corrugation 14.

Figures 15 and 16 illustrate sections of the tape 11 facing a corrugation the end of which does not form a sharp edge, Figure 15 being a section made at *op* and going through the lower portion of a concave corrugation 17 and Figure 16 being a section made at *qr* and going through the upper portion of a convex corrugation 18.

Figure 17:
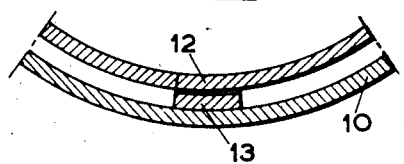
Figures 17 and 18 illustrate in fragmentary section, a tube formed from the tape of Figure 9 at its point of closure.
Figure 18:
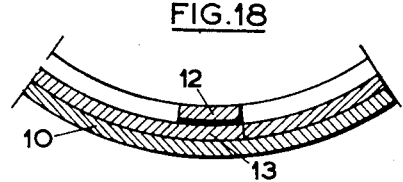

Figures 17 and 18 illustrate in section, the tube formed from the tape 11 at its point of closure; the section of the tube in Figure 17 corresponds to the section of the tape of Figure 13 and the section of the tube 18 to the section in Figure 14; there is illustrated at 10, as in Figures 7 and 8, an outer tape used for holding the corrugated tape in tubular form.

The metal tape provided by the present invention may be employed to form, for instance in an electric telecommunication cable, the outer conductor of a coaxial pair of conductors or the screen or shield for a symmetrical pair of conductors.

Figure 19:
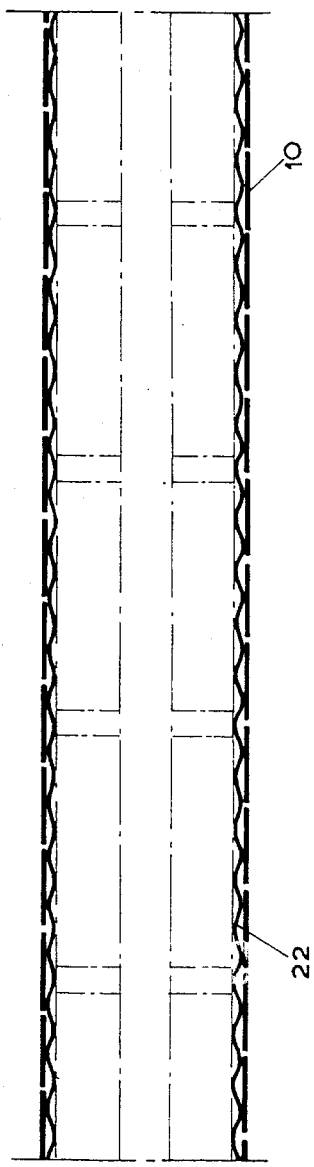
Figure 19 illustrates a view, in longitudinal section, of a coaxial pair of conductors the outer conductor of which is made in accordance with the present invention.

Figure 19 illustrates, by way of example, the longitudinal section of a coaxial pair of conductors, the outer conductor 22 of which is formed from a tape according to the present invention and forms a tube with corrugated walls of an indefinite length, and on to which is wound, by way of example, a tape 10 for holding the tape in tubular form; the elements in dash-dot lines represent the central elements of the coaxial pair of conductors; these elements which are not part of the present invention are given by way of example and it is quite obvious that the insulation between the coaxial pair of conductors may be provided by insulating washers, as shown in Fig. 19, or could be a continuous insulation.

What is claimed is:

1. In a tubular metallic conductor, a thin metal tape cambered around an axis parallel to its length and comprising a main portion having corrugations extending transversely thereof and terminating short of the opposite side edges of the tape to provide smooth edge portions at the opposite sides of the main portion each having a width which is small in relation to the width of the main portion, said smooth edge portions of the tape lying in parallel planes and being displaced from each other in the direction normal to said planes by a distance at least equal to the thickness of said smooth edge portions, said corrugations being formed with the convexities thereof alternately directed toward the opposite faces of said tape, and at least certain of said corrugations terminating at one end on the face of the tape toward which the convexity of the related corrugation is directed in an end edge surface perpendicular to the adjacent one of said smooth edge portions to provide a stop, said smooth edge portions at the opposite sides of the tape overlapping and each side edge of the tape abutting against the stop formed by said end edge surfaces of the corrugations terminating adjacent the opposite side edge of the tape.

2. In a tubular metallic conductor, a thin metal tape cambered around an axis parallel to its length and comprising a main portion having corrugations extending transversely thereof and terminating short of the opposite side edges of the tape to provide smooth edge portions at the opposite sides of the main portion each having a width which is small in relation to the width of the main portion, said smooth edge portions of the tape lying in parallel planes and being displaced from each other in the direction normal to said planes by a distance substantially equal to the thickness of said smooth edge portions, said corrugations being formed with the convexities thereof alternately directed toward the opposite faces of the tape, the convexity of each corrugation being substantially tangential to that surface of the smooth edge portion disposed at one end of the corrugation which faces in the same direction as the related convexity, the opposite ends of at least certain of said corrugations each terminating in an end edge surface perpendicular to the other of said smooth edge portions to define a stop on the surface of said other smooth edge portion facing in the same direction as the related convexity, said smooth edge portions at the opposite sides of the tape overlapping and each side edge of the tape abutting against the stop formed by said end edge surfaces of the corrugations terminating adjacent the opposite side edge of the tape.

(References on following page)

References Cited in the file of this patent

UNITED STATES PATENTS

| Number | Name | Date |
|---|---|---|
| 463,107 | Degenhardt | Nov. 10, 1891 |
| 861,242 | Edison | July 23, 1907 |
| 1,090,843 | Golding | Mar. 24, 1914 |
| 1,933,279 | Quarnstrom | Oct. 31, 1933 |
| 2,059,292 | Taylor | Nov. 3, 1936 |
| 2,126,290 | Seeley | Aug. 9, 1938 |
| 2,156,772 | Seeley | May 2, 1939 |
| 2,479,924 | Gillis | Aug. 23, 1949 |
| 2,606,953 | Weston | Aug. 12, 1952 |

FOREIGN PATENTS

| Number | Country | Date |
|---|---|---|
| 624,603 | Germany | Sept. 2, 1936 |
| 678,201 | Germany | July 10, 1939 |